United States Patent [19]
Fisher

[11] Patent Number: 4,946,619
[45] Date of Patent: Aug. 7, 1990

[54] SOLUBILIZATION OF BRIGHTER IN LIQUID HYPOCHLORITE

[75] Inventor: Jeffrey J. Fisher, Antioch, Calif.

[73] Assignee: The Clorox Company, Oakland, Calif.

[21] Appl. No.: 221,067

[22] Filed: Jul. 19, 1988

[51] Int. Cl.⁵ .............................................. C09K 3/00
[52] U.S. Cl. .......................... 252/187.24; 252/187.25; 252/187.26; 252/186.34; 252/102; 252/301.23
[58] Field of Search .............. 252/102, 301.23, 187.24, 252/187.25, 187.26

[56] References Cited

U.S. PATENT DOCUMENTS

| | | | |
|---|---|---|---|
| 3,560,389 | 2/1971 | Hunting | 252/95 |
| 3,655,566 | 3/1970 | Robinson et al. | 252/95 |
| 3,666,680 | 5/1972 | Briggs | 252/95 |
| 3,684,722 | 8/1972 | Hynam et al. | 252/98 |
| 3,689,421 | 9/1972 | Briggs | 252/95 |
| 3,939,153 | 7/1968 | Zimmerer et al. | 252/95 |
| 3,998,750 | 12/1976 | Payne et al. | 252/108 |
| 4,229,313 | 10/1980 | Joy | 252/98 |
| 4,271,030 | 6/1981 | Brierley et al. | 252/98 |
| 4,282,109 | 8/1981 | Citrone et al. | 252/102 |
| 4,337,163 | 6/1982 | Schilp | 252/96 |
| 4,390,448 | 6/1983 | Boden et al. | 252/187.26 |
| 4,399,050 | 8/1983 | Bentham | 252/95 |
| 4,438,024 | 3/1984 | Del Greco et al. | 252/545 |
| 4,474,677 | 10/1984 | Foxlee | 252/98 |
| 4,526,700 | 7/1985 | Hensley et al. | 252/102 |
| 4,559,169 | 12/1985 | Wevers et al. | 252/543 |
| 4,576,728 | 3/1986 | Stoddart | 252/102 |
| 4,585,570 | 4/1986 | Nelson | 252/102 |
| 4,588,514 | 5/1986 | Jones et al. | 252/98 |
| 4,623,476 | 11/1986 | Nayar et al. | 252/94 |
| 4,708,816 | 6/1987 | Chang et al. | 252/186.25 |
| 4,790,953 | 12/1988 | Mansy | 252/187.26 |

FOREIGN PATENT DOCUMENTS

| | | |
|---|---|---|
| 0079697 | 11/1981 | European Pat. Off. . |
| 0128619 | 1/1984 | European Pat. Off. . |
| 0110544 | 6/1984 | European Pat. Off. . |
| 145084 | 6/1985 | European Pat. Off. . |
| 0237119 | 3/1986 | European Pat. Off. . |
| 186386 | 7/1986 | European Pat. Off. . |
| 0204472 | 12/1986 | European Pat. Off. . |
| 0206718 | 12/1986 | European Pat. Off. . |
| 106407 | 4/1987 | European Pat. Off. . |
| 0244611 | 11/1987 | European Pat. Off. . |
| 61-123700 | 6/1986 | Japan . |
| 1329086 | 9/1973 | United Kingdom . |
| 1466560 | 3/1977 | United Kingdom . |
| 2003522 | 3/1979 | United Kingdom . |
| 1548379 | 7/1979 | United Kingdom . |

*Primary Examiner*—Matthew A. Thexton
*Assistant Examiner*—Joseph D. Anthony
*Attorney, Agent, or Firm*—Michael J. Mazza; Joel J. Hayashida; Stephen M. Westbrook

[57] ABSTRACT

A stable bleaching and brightening composition is provided comprising
(a) an active halogen source;
(b) an amine oxide surfactant;
(c) a stilbene sulfonic acid type FWA and
(d) a pH adjusting agent; and wherein the ratio of amine oxide:FWA is 3:1 to 10:1.

A preferred method for making the composition is to prepare a concentrated surfactant solution of at least 20% surfactant, then dissolve the FWA therein to form a stable premix. The active halogen source, pH adjusting agent and any option ingredients are then combined with the premix. The resulting composition has good brightener and hypochlorite stability, and good brightener solubility.

10 Claims, No Drawings

SOLUBILIZATION OF BRIGHTER IN LIQUID HYPOCHLORITE

BACKGROUND OF THE INVENTION

1. Field of the Invention

This invention relates to hypochlorite bleaching compositions, and more specifically to such compositions containing solubilized optical brighteners.

2. Description of the Relevant Art

A wide variety of aqueous compositions for improving the whiteness of fabrics or textiles, or the consumers' perception thereof, are known in the art. Chief among these are bleaching agents which improve fabric whiteness by oxidizing stains. Such bleaching agents include peroxygen, peracid, and halogen bleaches, the latter of which are most commonly used owing to their stability, effectiveness and low cost. Another widespread method of treating fabrics to increase the consumers' perception of fabric brightness is to deposit onto the fabric a fluorescent whitening agent, sometimes known as an optical brightener. Fluorescent whitening agents (FWAs) have the ability to absorb ultraviolet radiation and to re-emit it in the form of visible light, thus increasing the apparent brightness of the fabric treated therewith. It is especially advantageous to combine the fluorescent whitening agent with the bleach to achieve a fabric treatment composition which both removes stains to improve actual whiteness, and deposits FWAs to enhance apparent whiteness. There are, however, drawbacks associated with such compositions. Many FWAs are incompatible with halogen bleaches, as they will be oxidized thereby, destroying their effectiveness. Halogen-compatible FWAs are generally insoluble in aqueous solutions thereof, requiring additional components to either disperse, or solubilize them. Zimmerer et al. U.S. Pat. No. 3,939,153 represents a typical approach to formulating a FWA as a particulate dispersion. Such dispersions may be physically unstable, settling out over time, and even those that are relatively stable may result in undesirable brightener staining if the FWA does not uniformly dissolve in the wash liquor. Accordingly, it is most desirable to formulate halogen bleaches with a soluble FWA. This approach is represented by Payne et al U.S. Pat. No. 3,998,750 which utilizes a distyryl-type FWA, solubilized by alkaline earth cations. U.K. patent application No. 2,026,566 solubilizes a stilbene-type FWA using a fatty alkoxylated amine disulfide salt. EPA application 186,386, inventor Mansy, describes a stilbene-disulfonic acid (or salt) FWA solubilized by an amine oxide in a hypochlorite bleach. The formulation of Mansy requires a relatively high level of amine oxide and teaches a ratio of amine oxide to brightener of from 40:1 to 10:1. Mansy further teaches that the composition must be made up by dissolving surfactant and brightener in an aqueous solution, thereby forming a dilute aqueous base mixture of surfactant, FWA and water, an adding thereto sufficient hypochlorite to yield a volume of from 0.4 to 8 times the volume of the brightener/surfactant solution.

Applicants have surprisingly discovered however, that certain hereinafter defined FWAs can be stably solubilized in hypochlorite by low ratios of amine oxide:FWA. This is achieved by premixing FWA in concentrated surfactant, then adding directly to this concentrated premix an aqueous solution of the bleach, preferably hypochlorite, as well as any adjuncts. A pH adjusting agent aids the physical and chemical stability of the composition.

Accordingly, it is an object of the present invention to achieve a stable solution of fluorescent whitening agent and bleach.

It is another object of the present invention to provide a stable solution which minimizes brightener spotting on fabrics treated therewith.

It is another object of the present invention to provide a composition that is more cost effective, owing to the lower levels of expensive surfactant.

It is yet another object of the present invention to provide a concentrated brightener/surfactant premix which minimizes dilution of the halogen source, thus minimizing manufacturing costs and processing steps.

BRIEF SUMMARY OF THE INVENTION

The present invention provides a stable bleaching and brightening composition comprising (a) an active halogen source;

(b) a stilbene sulfonic-acid fluorescent whitening agent;

(c) an amine oxide surfactant, wherein a ratio of amine oxide:FWA is between about 3:1 to 10:1, exclusive; and (d) a pH adjusting agent.

To achieve the FWA solubilization at the surprisingly low levels of amine oxide, a concentrated solution of at least about 20 % surfactant is required. The FWA is added to this concentrated solution to yield a concentrated FWA/surfactant premix. An aqueous solution of the halogen bleaching compound is then combined with the premix along with the pH adjusting agent, plus any optional ingredients.

It is an advantage of the present invention that stable aqueous solutions of bleach and FWA can be achieved using low levels of surfactant.

It is another advantage of the composition of the present invention that the resulting solutions are chemically and physically stable over a typical storage temperature range, and for commercially acceptable times.

It is yet another advantage of the present invention that the stable solution of FWA reduces brightener spotting on fabrics treated therewith.

It is yet another advantage of the concentrated premix of the present invention that dilution of the halogen source is minimized, thus simplifing manufacturing.

These and other objects and advantages of the present invention will no doubt become apparent to those skilled in the art after having read the following detailed description of the preferred embodiments.

DETAILED DESCRIPTION OF THE PREFERRED EMBODIMENTS

In a first embodiment of the present invention, the composition comprises, in aqueous solution, the essential components of (a) an active halogen source;

(b) a FWA selected from the group consisting of the acid, or sodium or potassium salts of:

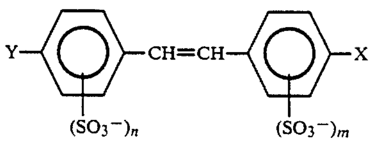

wherein: n+m=1 to 4;

wherein: n + m = 1 to 4;

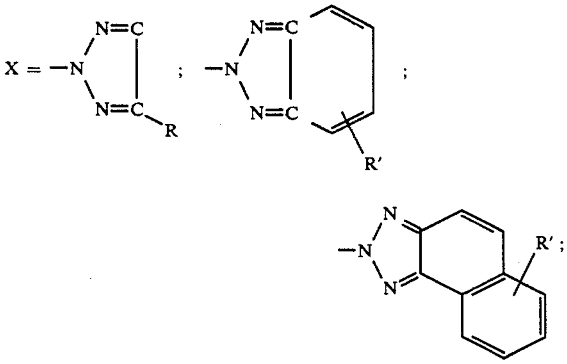

R=H, alkyl, aryl, alkoxy or halogen;
R'=R or $SO_3^-$; and
Y=X or R;

(c) an amine oxide surfactant, the surfactant and FWA being present in a ratio between about 3:1 to 10:1; and (d) a pH adjusting agent.

A preferred method for making the composition of the present invention comprises preparing a concentrated solution of at least about 20 percent, preferably about 25 percent, more preferably about 30 percent surfactant, and then dissolving the FWA therein at a ratio of amine oxide:FWA of between about 3:1 and 10:1, exclusive, to yield a FWA/surfactant premix. preferred for a commercial formulation is about 4:1 to 8:1, inclusive, AO:FWA. As used herein, all percentages are by weight, unless otherwise noted. The halogen compound and pH adjusting agent plus any optional ingredients are then combined with the premix in proportions to reach the desired result.

The foregoing composition ingredients will be described in greater detail in the following sections.

ACTIVE HALOGEN SOURCE

An active halogen source may be selected from various hypochlorite-producing species, for example, halogen bleaches selected from the group consisting of the alkali metal and alkaline earth salts of hypohalite, haloamines, haloimines, haloimides and haloamides. All of these are believed to produce hypohalous bleaching species in situ. Hypochlorite and compounds producing hypochlorite in aqueous solution are preferred, although hypobromite is also suitable. Representative hypochlorite-producing compounds include sodium, potassium, lithium and calcium hypochlorite, chlorinated trisodium phosphate dodecahydrate, potassium and sodium dicholoroisocyanurate and trichlorocyanuric acid. Organic bleach sources suitable for use include heterocyclic N-bromo and N-chloro imides such as trichlorocyanuric and tribromo-cyanuric acid, dibromo- and dichlorocyanuric acid, and potassium and sodium salts thereof, N-brominated and N-chlorinated succinimide, malonimide, phthalimide and naphthalimide. Also suitable are hydantoins, such as dibromo and dichloro dimethyl-hydantoin, chlorobromodimethyl hydantoin, N-chlorosulfamide (haloamide) and chloramine (haloamine). Particularly preferred in this invention is sodium hypochlorite having the chemical formula NaOCl, in an amount ranging from about 0.1 weight percent to about 15 weight percent, more preferably about 0.2 % to 10 %, and most preferably about 2.0 % to 6.0 %. It may be necessary to add a buffer or other alkaline agent to increase the composition pH to above about 10.5, preferably about 12.0 to maintain the storage stability of the composition.

FLUORESCENT WHITENING AGENT

A fluorescent whitening agent (FWA), also referred to as an optical brightener, is an essential component of the composition of the invention. Such products are fluorescent materials, often substituted stilbenes and biphenyls, and have the ability to fluoresce by absorbing ultraviolet wave-lengths of light and re-emitting visible light. The choice of the FWA is dictated by its resistance to degradation by the bleach, brightening effectiveness, solubility and physical and chemical stability. Preferred fluorescent whitening agents meeting the above criteria possess the structure illustrated by the following structure:

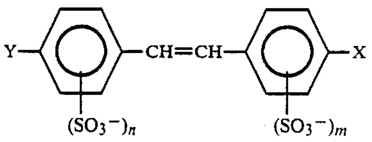

wherein: n+m=1 to 4;

wherein: n + m = 1 to 4;

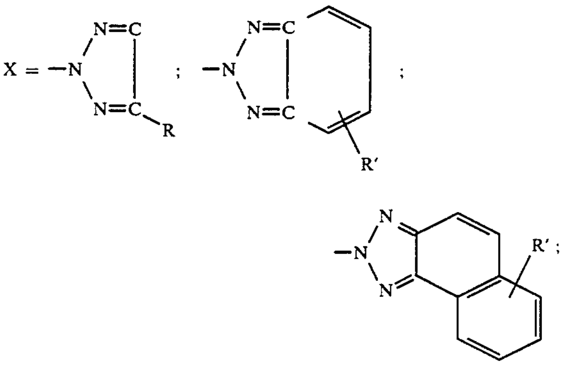

R=H, alkyl, aryl, alkoxy or halogen;
R'=R or $SO_3^-$; and
Y=X or R.

Especially preferred FWA's are those sold by the Mobay Chemical Corporation under the tradename PHORWITE. Most preferred are PHORWITE BHC, CNA, and CL. These are all forms of 4,4'-bis (4-phenyl-2H-1,2,3 triazolyl)-(2)-stilbene-2,2'disulphonic acid, with BHC being the dipotassium salt, CNA the disodium salt and CL the acid form. The salt forms of the FWA are most preferred as they require no preneutralization. Also suitable from solubility and stability standpoints, but not preferred from a whitening-effectiveness standpoint, is PHORWITE BKL, a tetra sulfonated variant. Mixtures of any of the foregoing FWAs are also acceptable. The FWA is present in an amount necessary to brighten, preferably from about 0.03 to about 0.5 % by weight. More preferred is about 0.1–0.4 % by weight.

Generally, the FWAs should not contain primary or secondary amine groups or hydroxyl groups as the presence of these groups renders the FWA relatively unstable in the presence of a halogen bleach.

AMINE OXIDE

As mentioned herein above, the surfactant suitable for use in this invention is a bleach-stable nonionic surfactant. It is especially preferred to use amine oxides, especially trialkyl amine oxides. A representative structure is set forth below.

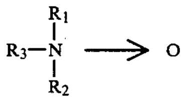

In the structure above, $R_1$, $R_2$ and $R_3$ are alkyl of 1 to about 20 carbons, and the sum of $R_1$, $R_2$ and $R_3$ is between about 10–24. More preferably $R_1$ and $R_2$ are each 1 to 3 carbons, and are most preferably methyl. $R_3$ is most preferably alkyl of about 10 to 16 carbon atoms. When $R_1$ and R2 are both methyl and $R_3$ is alkyl averaging about 12 carbon atoms, the structure for dimethyldodecylamine oxide, a particularly preferred amine oxide, is obtained. Representative examples of this particular bleach-stable nonionic surfactant includes the dimethyl dodecylamine oxides sold under the trademark AMMONYX® LO by Stepan Chemical Company of Chicago, Ill. Yet other preferred amine oxides are those sold under the trademark BARLOX® by Baird Chemical Industries, Inc. Still others include the CONCO XA series, sold by Continental Chemical Company, the AROMAX series sold by Armour Industrial Chemical Company, and the SCHERCAMOX series, sold by Scher Brothers, Inc. These amine oxides preferably have main alkyl chain groups averaging about 10 to 20 carbon atoms. Mixtures of any of the foregoing amine oxides are also suitable.

pH ADJUSTING AGENT pH adjustinq agents and buffers may be added to adjust or maintain pH. Examples of buffers include the alkali metal phosphates, polyphosphates, pyrophosphates, triphosphates, tetraphosphates, silicates, metasilicates, polysilicates, carbonates, hydroxides, and mixtures of the same. Control of pH may be necessary to maintain the stability of the halogen source and to avoid protonating the amine oxide. Where the active halogen source is sodium hypochlorite, the pH is maintained above about pH 10.5, preferably above or about pH 12. Most preferred for this purpose are the alkali metal hydroxides, especially sodium hydroxide. The total amount of pH adjusting agent/buffer including that inherently present with bleach plus any added, can vary from about 0 % to 5 %, preferably from about 0.1–1.0 %.

OPTIONAL INGREDIENTS

The compositions of the present invention may include a variety of optional ingredients to enhance the fabric-treating effectiveness, aesthetic appeal or performance thereof. Such ingredients may be selected from the group consisting of fragrances, builders, chelating agents, additional surfactants, antimicrobial agents, pigments, dyes and the like, subject only to the limitation that they be stable in the presence of, and not react with the bleach.

A process for making the composition of the present invention is provided and comprises making a premix of FWA and surfactant, which is subsequently combined with the bleach and any other components to yield the stable solutions. The premix requires making a concentrated surfactant solution, generally with at least about 20 %, preferably about 25 % and most preferably about 30 % surfactant. To this, sufficient of the FWA is added to result in the desired ratio of between 3:1 and 10:1 surfactant:FWA. Order and manner of addition of the other ingredients is not critical and may be accomplished in any manner consistent with, the foregoing.

EXPERIMENTAL RESULTS

Table 1 shows several formulations of the composition of the present invention, including the identified amounts of FWA, amine oxide, and NaOCl. In all cases the amine oxide was a dodecyltrimethyl amine oxide, and each formulation further included 1 % sodium hydroxide.

TABLE 1

| Formula | FWA | Wt. % | Amine Oxide Wt. % | Ratio AO:FWA | NaOCl Wt. % |
|---|---|---|---|---|---|
| 1 | BHC[(1)] | 0.04 | 0.20 | 5:1 | 5.25 |
| 2 | BHC | 0.12 | 0.60 | 5:1 | 5.25 |
| 3 | BHC | 0.24 | 1.20 | 5:1 | 5.25 |
| 4 | BHC | 0.30 | 1.50 | 5:1 | 5.25 |
| 5 | BHC | 0.35 | 1.65 | 5:1 | 5.25 |
| 6 | BHC | 0.10 | 1.00 | 10:1 | 5.25 |
| 7 | BHC | 0.10 | 1.00 | 10:1 | 0.53 |
| 8 | BKL[(2)] | 0.10 | 1.00 | 10:1 | 5.25 |

[(1)]PHORWITE BHC, a derivative of 4,4'-bis (4-phenyl-2H-1,2,3 triazolyl)-(2)-stilbene-2,2'-disulphonic acid, dipotassium salt (a trademarked product of the Mobay Chemical Corp).
[(2)]PHORWITE BKL, a tetra sulfonated derivative of BHC (a trademarked product of the Mobay Chemical Corp).

Whitening performance and stability of the compositions of the present invention were judged by the following procedures. Unbrightened cotton swatches were washed at 100° F. with 5 pounds of clean ballast composed of towels, dress shirts and tee shirts. Washing conditions included 67 liters of water, adjusted to 100 ppm hardness, and the manufacturer's recommended amount (1 cup; containing 0.2 % FWA) of TIDE detergent (a trademarked product of the Procter and Gamble Co.). Wash time was 10 minutes, followed by a 70° F. cold water rinse and a 45 minute hot air dry. Swatch whiteness was measured before and after the wash with a Gardner colorimeter and the difference calculated. The results, using the indicated formulas of Table 1, are shown in Table 2.

TABLE 2

Whitening Performance

| Formula | Cotton Whitening[(a)] |
|---|---|
| 1 | 17.7 |
| 2 | 22.9 |
| 3 | 25.6 |
| TIDE & Liquid bleach only[(b)] | 9.8 |

TABLE 2-continued

| Whitening Performance | |
|---|---|
| Formula | Cotton Whitening[a] |
| TIDE only | 13.7 |

[a]as measured on the colorimeter using the Stensby equation.
[b]As CLOROX liquid bleach Stability of the FWAs of various compositio invention was evaluated by measuring fluorescnece and whitening (a measure of the amounts of FWA and hypochlorite respectively, remaining). Four swatches of unbrightened cotton were washed in 1 liter of distilled water containing 1.31 grams of detergent (without FWA) and 3.8 grams of a composition of the present invention including 0.1 % of the FWA, 1.0 % amine oxide and 1.0 % NaOH, and 5.12 % sodium hypochlorite. The was 12 minutes at 100° F. with 34 grams of polycotton ballast. Whiteness was measured before and after washing with a Gardner colorimeter and the difference calculated. Fluorescence was measured on a 1:1000 dilution of the test sample in distilled water at 70° F. with a Perkin-Elmer LS 5 spectroflorimeter. Excitation was at 350 nm and emission at 420 nm. The results are shown in Table 3.

TABLE 3

Stability of FWA's in Liquid Bleach

| Method | FWA | Days at 120° F. 0 | 1 | 4 | 7 | 14 |
|---|---|---|---|---|---|---|
| Dilute Solution | BHC[1] | 100 | 76 | 62 | 49 | 43 |
| Fluorescence | BKL[2] | 100 | 88 | 74 | 54 | 49 |
| Cotton | BHC | 16.6 | 14.6 | 10.7 | 11.4 | 9.4 |
| Whitening | BKL | 1.9 | 0.6 | 1.4 | 1.1 | 1.1 |
| | Control[b] | 1.3 | −0.6 | 0.4 | 0.6 | 1.1 |

[1]PHORWITE BHC, a derivative of 4,4'-bis (4-phenyl-2H-1,2,3 triazolyl)-(2)-stilbene-2,2'-disulphonic acid, dipotassium salt (a trademarked product of the Mobay Chemical Corp).
[2]PHORWITE BKL, a tetra sulfonated derivative of BHC PHORWITE (a trademarked product of the Mobay Chemical Corp).
[b]contained AATCC standard detergent (without brightener) plus CLOROX liquid bleach only.

Table 3 shows that the preferred FWAs of the present invention have good storage stabilities in the presence of bleach, even at elevated temperatures.

TABLE 4

Effect of Amine Oxide on Brightener Stability (0.3% BHC) Dilute Solution Fluorescence
Percent FWA remaining

| NaOH | Amine Oxide | Ratio AO:FWA | Days at 120° F. 3 | 5 | 7 | 10 |
|---|---|---|---|---|---|---|
| 1.0% | 0.9 | 3:1 | 77 | 58 | 42 | 26* |
| 1.0% | 1.2 | 4:1 | 66 | 46 | 31 | 25 |
| 1.0% | 1.5% | 5:1 | 64 | 45 | 30 | 19 |
| 1.0% | 3.0% | 10:1 | 50 | 27 | 15 | 9 |
| 0.0% | 0.9% | 3:1 | 27 | 1 | 0 | 0 |

*Sample exhibited some brightener settling; result may be inaccurate.

Tables 4 and 5 demonstrate the advantage of the present invention conferred by reducing the amount of amine oxide needed to solubilize the brightener. It can be seen that as the ratio of amine oxide: FWA incrases, the percentage FWA remaining rapidly decreases. Table 4 also demonstrates the importance of pH adjustment on stability of the FWA, as the sample without NaOH rapidly lost fluorescence.

Table 5 demonstrates a similar effect on hypochlorite stability, i.e. increasing the ratio of amine oxide:FWA decreases the amount of available hypochlorite. Thus, about 73 % hypochlorite remained after 10 days at 120° F. at a ratio of AO:FWA of 4:1 compared with only 58.8 % at a ratio of 10:1. A control, with no amine oxide, FWA or pH adjusting agent had 84.8 % hypochlorite remaining under the same storage conditions. The compositions of Table 5 all initially contained 5.12 % hypochlorite.

TABLE 5

Effect of Amine Oxide on Hypochlorite Stability
Percent Hypochlorite Remaining

| FWA | OH⁻ | Amine Oxide | Ratio AO:FWA | Days at 120° F. Days at 120° F. 5 | after 7 | 10 10 | % Remaining days |
|---|---|---|---|---|---|---|---|
| 0.0 | 0.0 | 0.0 | | 4.85 | 4.67 | 4.34 | 84.4 |
| 0.3 | 1.0 | 0.9 | 3:1 | 4.48 | 4.26 | 3.76 | 73.4 |
| 0.3 | 1.0 | 1.2 | 4:1 | 4.33 | 3.94 | 3.74 | 73.0 |
| 0.3 | 1.0 | 1.5 | 5:1 | 4.32 | 3.94 | 3.46 | 67.6 |
| 0.3 | 1.0 | 3.0 | 10:1 | 4.20 | 3.83 | 3.01 | 58.8 |

Table 2 shows that whitening performance is directly related to the amount of FWA present. Tables 4 and 5 show the adverse effects of increasing amine oxide on the hypochlorite and FWA stabilities. It is thus apparent that the compositions of the present invention, having low levels of amine oxide result in a significant gain in brightening and whitening performance without a concommitant increase in amounts of FWA and/or bleach.

Table 6 illustrates the importance of the method of the present invention wherein a premix of at least 20 % surfactant and brightener is prepared. Formulation A is a formulation of the art wherein an aqueous solution of surfactant and FWA is added to a hypochlorite solution. Formulation A was made by first dissolving 1 gram of PHORWITE CNA in the minimum amount of 60° C. DI water (540 g) to produce a clear solution. To this was added 33.3 grams of a 30 % amine oxide solution to produce the desired weight ratio of 10:1. After a ten minute equilibration, the solution was diluted with 415.7 grams of 12.6 % hypochlorite bleach to make a formula having 1.0 % amine oxide, 0.1 % FWA and 5.3 % NaOCl. Ten grams of 50 % NaOH was added to provide 0.5 % NaOH, resulting in a composition pH of 13.

Formulation B was made utilizing the concentrated premix of the present invention to wit: 1 gram of PHORWITE CNA was mixed into 16.7 grams of 30 % amine oxide to yield a weight ratio of AO:FWA of 5:1. After equilibration, 977.3 grams of 5.4 % hypochlorite bleach was added to produce a composition that was 0.5 % amine oxide, 0.1 % FWA and 5.3 % NaOCl. Ten grams of 50 % NaOH was added to bring the mixture to 0.5 % NaOH, resulting in a composition pH of 13.

Samples were stored for 3 days at each indicated temperature and visually checked for phase stability.

TABLE 6

Composition Phase Stability

| Formulation | | Ratio Amine Oxide:FWA 2:1 | 4:1 | 5:1 | 6:1 | 8:1 | 10:1 |
|---|---|---|---|---|---|---|---|
| A | 70° F. | S | S | S | S | C | C |
| | 100° F. | S | S | S | S | S | C |
| B | 70° F. | S | C | C | C | C | C |

TABLE 6-continued

| Composition Phase Stability | | | | | | |
|---|---|---|---|---|---|---|
| | Ratio Amine Oxide:FWA | | | | | |
| Formulation | 2:1 | 4:1 | 5:1 | 6:1 | 8:1 | 10:1 |
| 100° F. | S | S | C | C | C | C |

C = Clear, single phase composition.
S = Composition separated.

It can be seen from Table 6 that the formula invention yields a clear stable composition, even at 100° F., with a ratio of amine oxide:FWA of only 5:1. By contrast the formulation of the prior art was not phase stable even at a AO:FWA ratio of 8:1.

While described in terms of the presently preferred embodiments, it is to be understood that such disclosure is not to be interpreted as limiting. Various modifications and alterations will no doubt occur to one skilled in the art after having read the above disclosure. Accordingly, it is intended that the appended claims be interpreted as covering all such modifications and alterations as fall within the true spirit and scope of the invention.

I claim:

1. A bleaching and brightening composition comprising (a) an active halogen source;

(b) a FWA selected from the group consisting of the acid, or sodium or potassium salts of:

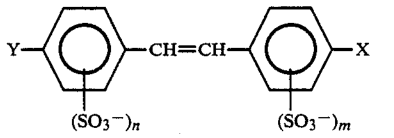

wherein: n+m=1 to 4;

wherein: n + m = 1 to 4;

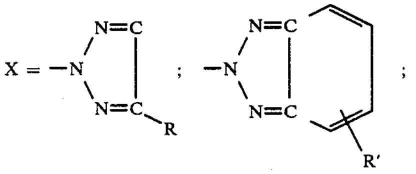

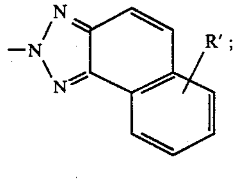

R=H, alkyl, aryl, alkoxy or halogen;

R'=R or $SO_3^-$; and

Y=X or R;

(c) a dodecyldimethyl amine oxide as the sole surfactant; and (d) a pH adjusting agent; and wherein the amine oxide and FWA are present in a ratio of from 3:1 to 8:1, exclusive, whereby a stable solution results.

2. The composition of claim 1 wherein the active halogen source is sodium hypochlorite.

3. The composition of claim 1 wherein the FWA is selected from the group consisting of 4,4'-bis (4-phenyl-2H-1,2,3 triazolyl)-(2)-stilbene-2,2'disulfonic acid, the sodium salt thereof, the potassium salt thereof, and mixtures thereof.

4. The composition of claim 1 wherein the pH adjusting agent is selected from the group consisting of alkali metal phosphates, polyphosphates, pyrophosphates, triphosphates, tetraphosphates, silicates, metasilicates, polysilicates, carbonates, hydroxides, and mixtures thereof.

5. The composition of claim 1 wherein the active halogen source is present in an amount of about 0.1 to 15 weight percent, the FWA is present in an amount of about 0.03 to 0.5 weight percent, the amine oxide is present in an amount from about 0.09 to 5 weight percent and the pH adjusting agent is present in an amount of to result in a pH of above about 10.5.

6. A stable brightening and bleaching composition comprising in aqueous solution (a) a bleaching-effective amount of an active halogen compound;

(b) a pH adjusting agent in an amount sufficient to yield a composition pH of about 10.5 or greater;

(c) at least 0.24 weight percent of a fluorescent whitening agent; and (d) an amine oxide as the sole surfactant, in an amount wherein a ratio of amine oxide:fluorescent whitening agent between 3:1 to 10:1, exclusive, and whereby a stable solution results.

7. The composition of claim 6 wherein the FWA is selected from the group consisting of the acid, or sodium or potassium salts of:

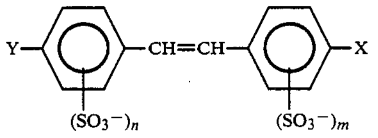

wherein: n+m=1 to 4;

wherein: n + m = 1 to 4;

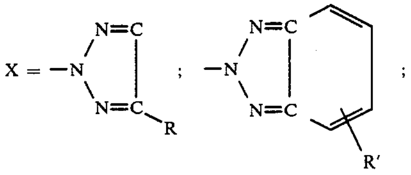

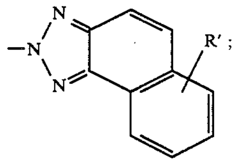

R=H, alkyl, aryl, alkoxy or halogen;

R'=R or $SO_3^-$;

Y=X or R; and mixtures thereof.

8. A method for preparing a stable bleaching and brightening composition comprising the steps of (a) preparing an aqueous solution of at least about 20 % of a dodecyldimethyl amine oxide as the sole surfactant;

(b) adding to the solution of (a) a quantity of stilbene disulfonic acid FWA to result in a brightener premix having a ratio of amine oxide:brightener of between 3:1 to 8:1 exclusive;

(c) preparing an aqueous solution of an active halogen compound and sufficient alkali-metal hydroxide to result in a pH of above about 10.5; and (d) combining the solution of (c) with the premix whereby a clear stable solution results.

9. The method of claim 8 wherein the FWA is a FWA selected from the group consisting of the acid, or sodium or potassium salts of:

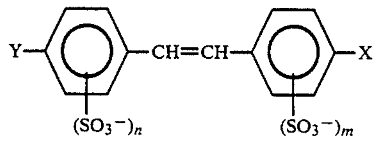

wherein: n+m=1 to 4;

wherein: n + m = 1 to 4;

-continued

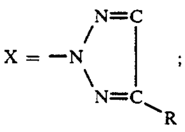
;
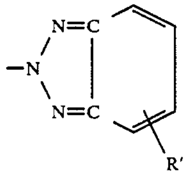
;
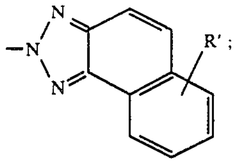

R=H, alkyl, aryl, alkoxy or halogen;

R'=R or $SO_3^-$;

Y=X or R; and mixtures thereof.

10. The method of claim 8 wherein the FWA is present in the solution of (d) in an amount of at least 0.24 wt. percent.

* * * * *